May 29, 1962

R. L. MILLS ETAL 3,036,530

GOVERNOR FOR PIPELINE APPARATUS

Filed May 5, 1960

INVENTORS
ROBERT L. MILLS
BY HARVARD J. BRYAN

REG. PATENT AGENT

May 29, 1962  R. L. MILLS ETAL  3,036,530
GOVERNOR FOR PIPELINE APPARATUS
Filed May 5, 1960  2 Sheets-Sheet 2
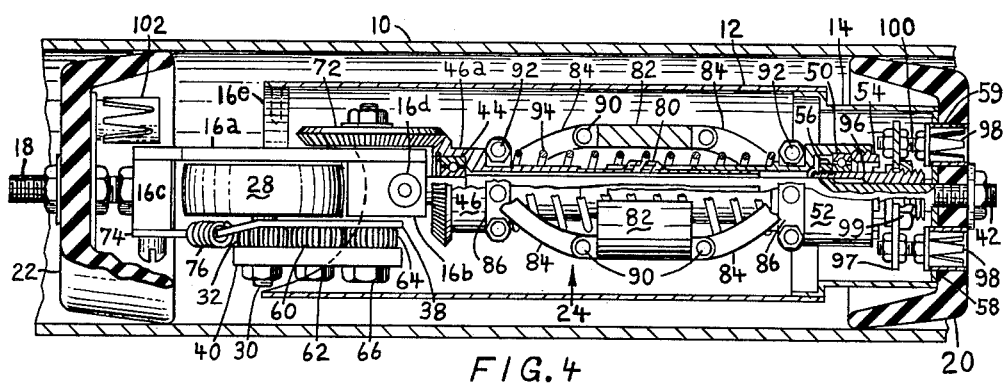
FIG. 4
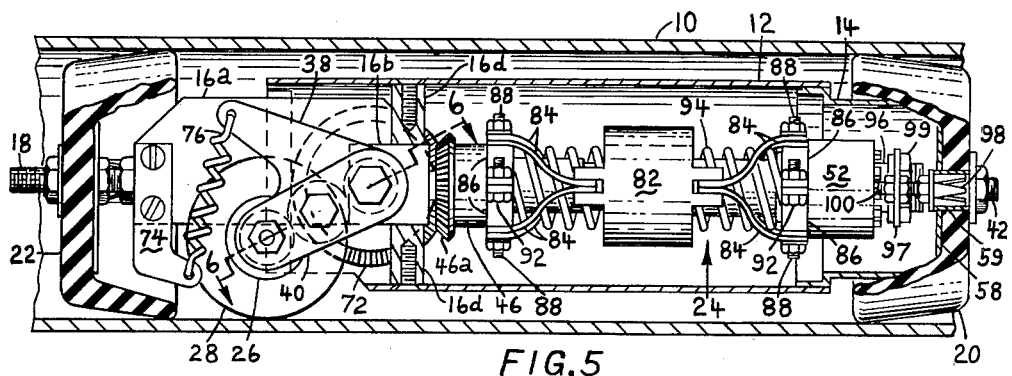
FIG. 5
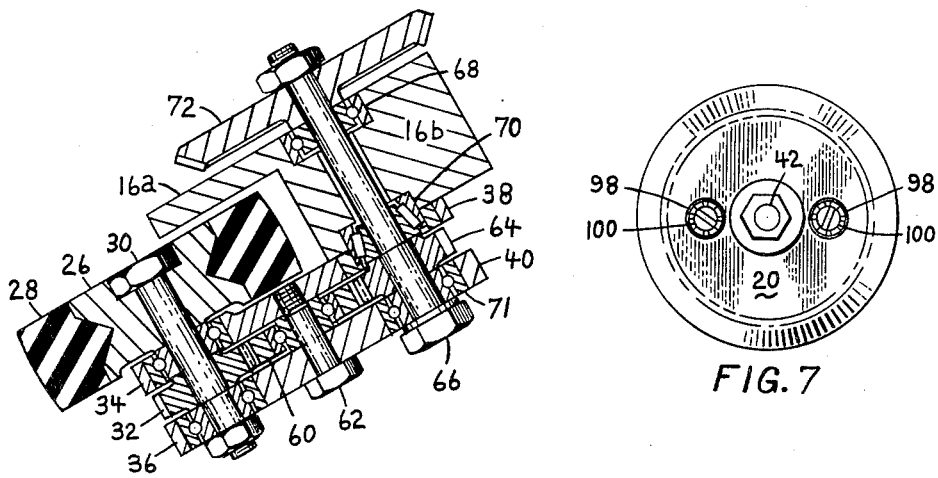
FIG. 6
FIG. 7
INVENTORS
ROBERT L. MILLS
BY HARVARD J. BRYAN
REG. PATENT AGENT

# United States Patent Office 3,036,530
Patented May 29, 1962

3,036,530
GOVERNOR FOR PIPELINE APPARATUS
Robert L. Mills and Harvard J. Bryan, Dallas, Tex., assignors to Harvest Queen Mill & Elevator Company, Dallas, Tex., a corporation of Texas
Filed May 5, 1960, Ser. No. 27,189
2 Claims. (Cl. 104—155)

This invention relates to pipeline maintenance operations and particularly to a propelling apparatus having a speed-governor mechanism, said apparatus being propelled through the pipeline.

The invention is applicable to apparatus where translational movement is produced by pneumatic pressure differential in upstream and downstream zones.

The governor mechanism is to control any rate of translational movement within preselected reasonable limits by means of a wheel resiliently urged into firm frictional engagement with the pipeline inside surface. The wheel energy is utilized for effectuating certain limited mutual redistributions of the gas employed to propel the device by slightly altering the ratio between the pneumatic pressures upstream and downstream respectively alternatingly retarding and accelerating the apparatus. Valve means actuated by said wheel are adapted to momentarily mutually isolate and to momentarily establish communication between upstream and downstream zones to a degree which depends on the departure at any given moment from the predetermined desired velocity.

An object and advantage of this invention resides in the utilization of a controlled differential pneumatic pressure for speed control.

Another object and advantage is to provide a system consisting of a relatively few simple elements. Fabrication, operation and maintenance costs are thereby considerably reduced.

The pipeline may be used for the conveying of simple or of mixed liquids or gases. Where there are two cargo constituents, one of them may be the carrier for the other.

The energy-transmitting means from the wheel to the control valves may be of the entirely gear-shaft-link type or may assume a more complex form wherein the wheel energy is transformed into electric energy or into hydraulic-pressure energy. Because of its simplicity, an embodiment of the invention of the gear-shaft-link type has been adopted as the subject of this specification and the accompanying drawings, to which reference may now be had in which:

FIG. 4 is a side view partly in an axial plane;

FIG. 5 is a broadside view partly in an axial plane normal to that of FIG. 4;

FIG. 6 is a sectional view of certain elements seen in stepped plane 6—6 in FIG. 5; and FIG. 7 is an end view of the fore end of the propelling apparatus.

Figure 1:
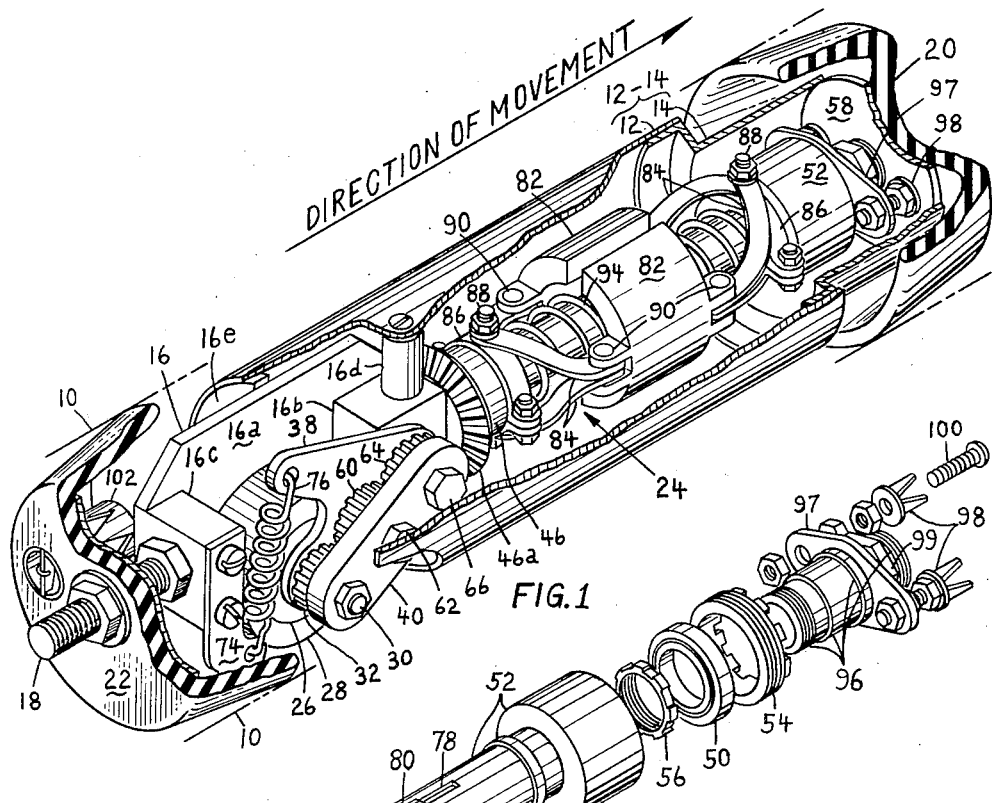
FIG. 1 is a perspective view of a typical embodiment.
Figure 2:
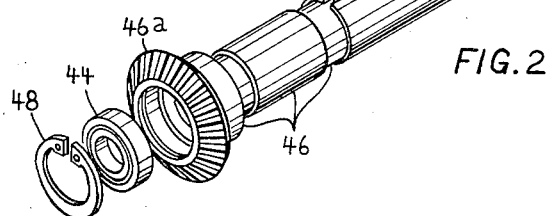
FIG. 2 is an exploded view depicting automatically operating valves.
Figure 3:
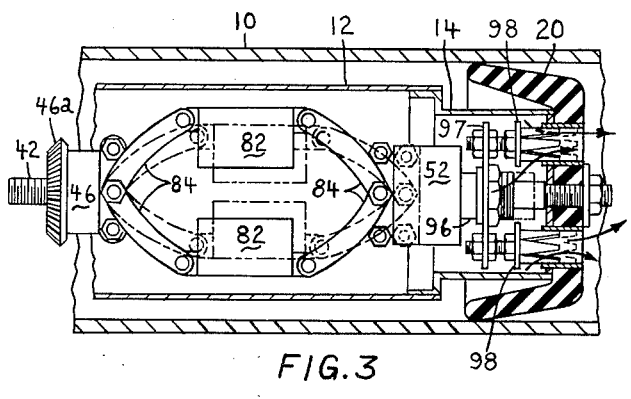
FIG. 3 is a fragmentary longitudinal sectional view of elements in the zone of and adjacent said valves in the open state.

The pipeline unit is seen occupying a pipeline or pipeline section whose inside surfaces are schematically indicated by dot-and-dash lines 10 and disposed for translational movement within the pipeline in the direction represented by the index line seen overhead in FIG. 1.

The propelling apparatus consists in the main of a built-up casing, of a fore member or cup fashioned of elastomeric material, and of an aft guiding member, the two endwise flanking the casing, of a wheel, and of a certain casing-contained speed-governor mechanism, said fore cup and said aft guiding member being collectively referred to by the expression, the two end members. The casing 12—14 consists of the cylindrical body 12 which is a relatively long and wide member and the thereto affixed cap 14, a relatively short member having in longitudinal sectional aspect the form of a hat but modified by the presence of a secondary annular flange that can be affixed by resistance welding to the fore end of body 12 because the rearwardly extending flange flares outside the fore end of body 12. The rear end of said casing, specifically of body 12, is affixed to a fitting 16 and consists of the base 16a, a thereto welded aft flange 16c, a connector flange 16e, a bearing block 16b and two welded connector studs 16d. The fitting 16, specifically of elements 16d and 16c, is secured to body 12 by screws which, although not identified by reference characters in FIGS. 1, 4 and 5, are quite visible. Affixed to flange 16c, by means of a threaded stud 18, is a rear guiding member 22, in this case an elastomeric cup, the flange thereof extending forwardly. One of its functions is to prevent yawing of the propelling apparatus during said translational movement.

The numeral 24 is a reference character to the collectivity of operative elements constituting the governor mechanism in general. They comprise, to begin with the one which locally initiates gear action, namely, said wheel, 26—28, the wheel body being 26 and the resilient tire thereon being 28. Body 26 is mounted on axle 30, on which the spur gear 32 is keyed, axle 30 being journalled in two ball bearings, 34 and 36, held respectively in two mutually coacting links, 38 and 40. The maximal outside diameter of each of said two cups, when in the non-installed, relaxed state, exceeds the inside diameter of the respective pipeline, whereby, when the propelling apparatus occupies it, the two cups are compressed and the flange free edges firmly press, somewhat sealingly, on the pipeline inside surfaces.

Extending axially thru casing 12—14 is the axle 42, which, respecting its rear end, is journalled in ball bearing 44, adjoining bevel gear 46a, the respective retainer ring being 48; an intermediate part of axle 42, but closer to the front than to the rear end thereof, is journalled in ball bearing 50, which is housed in the front end of female torque shaft 52, the respective retainer ring being 54 and the respective nut, 56. Affixed to the screwthreaded fore end of axle 42 is the fore one, 20, of said two cups, the flange of this one extending rearwardly, the associated affixing means consisting of a washer and a nut and, inside, a port-provided plate, 58, bearing on the annular edge of cap 14, the floor of the cup being perforated to constitute two ports respectively alined with the two ports in plate 58. Valve sleeves 59 are weldedly or otherwise rigidly affixed to plate 58 and extend thru said ports in cup 20. The double link or mutually coacting links, 38 and 40, hold, between them, the idler spur gear, 60. Pin 66 is journalled in ball bearing 68 and in thrust roller bearing, 70, in bearing block 16b. Link 40 pivots on ball bearing 71, mounted on pin 66, which mounts, on the opposite side of bearing block 16b, the bevel gear 72. Screwed to the flange 16c is the anchoring clip 74. Interveningly connecting it and an end of link 38 is the helical tension spring 76, which urges wheel 26—28 into firmly applied, frictional rolling engagement with the pipeline inside surface during the pivoting of links 38 and 40 about pin 66 in the course of translational movement of the propelling apparatus. Torque is thereupon transmitted thru the spur gears 32, 60 and 64 and bevel gear 72, which meshes with bevel gear 46a, which may, as depicted in FIGURE 4, be an integral portion of the hollow male torque shaft 46, constituting the rearmost portion of that shaft, or it may be a thereto firmly affixed separate member. Shaft 46 is received by female torque shaft 52, which is provided with an axially parallel groove, 78, adapted to snugly accommodate the key 80, which is an integral or thereto rigidly affixed part of shaft 46, the groove and the key constituting a spline for the mutually telescopic relationship between the two torque shafts during positive common rotation thereof.

Weights 82 are affixed to the male torque shaft 46 and the female torque shaft 52 by the links 84 and the yokes 86. Links 84 are pivotally affixed to yokes 86 by studs 88 and to the weights 82 by the pins 90. The yoke halves are fitted into grooves adjacent opposite ends of male torque shaft 46 and female torque shaft 52 (see FIGURE 4 and are retained by bolts 92. A helical compression spring, 94, bears on and intervenes between the mutually opposed yokes 86, while embracing both torque shafts. When the rotational speed of wheel 26—28 (and consequently that of said torque shafts) is high enough, the thereupon generated centrifugal force impels the weights 82 in radially outward directions, concomitantly compressing the spring 94, whereupon female torque shaft 52 is pulled rearwardly by links 84. Since the shaft 52 is freely rotatable on the fore fitting 96, to which the valve-mounting flange 97 is snugly held by nut 99 in a manner that permits the fitting to reciprocate therethrough, flange 97 and, with it, the thereto affixed valves 98 are pulled rearwardly, thereby clearing said ports in plate 58 and the respectively alined ports in the floor of cup 20. Screws 100 and associated elements make possible the adjustment of said valves, which are of the poppet type but where each valve head is provided with a plurality of therewith integral fingers which extend parallelwise with the valve axis. Each finger tapers from the valve head to the valve finger end. The function of the fingers is to assure port-axis-parallel reciprocating movement of the valve stem and consequently true seating of the valve head on the respective valve seat in plate 58. The object in providing them with a tapering form is to "gradualize" the opening and closing of the valves, resulting in less abrupt changes in the differential pneumatic pressures, removing from this speed governor the hunting phenomenon that all too often characterizes speed governors. Provided in the floor of aft cup 22 is a spring-loaded automatically operating check valve, 102, whose function can be discharged, instead, by a plurality of such valves. Constituting also the nose of the propelling apparatus, the screwthreaded fore end of axle 42 is readily adaptable to mutual affixment with a servicing-apparatus-engaging element or bumper when the propelling apparatus, instead of pulling, is used for pushing. When the propelling apparatus is employed in the more usual way, namely, hauling, it is then to the end of stud 18 to which the necessary coupling means is affixed, pulling either the single pipeline servicing apparatus or a train of such apparatus.

In view of the index line in FIGURE 1, it follows that the pipeline inside upstream zone, where the higher pneumatic pressure prevails, corresponds to (because it adjoins) the tail or aft cup 22. Inversely, the pipeline inside downstream zone, where the lower pneumatic pressure obtains, corresponds (because it adjoins) the fore or lead cup. Because of the compressible nature of the elastomeric material of which the cups are made, some of the higher-pressure gas will seep past cup 22 and into the intercup zone. The amount that will do so is governed by many variables. Among them are the relationships among the gas pressure zones, the elasticity of the cup constituting material, the ratio between the cup diameters respective to the relaxed state and to the compressed state (pipeline diameter), the angularity of the cup flange mean plane to the cup axis, the cup flange thickness, etc. Because of the multiplicity of variables, it is necessary to provide a more positive means for assuring the passage of sufficient gas masses from behind the aft cup into the intercup zone, and not to depend on seepage alone. Such a positive means is provided for in the presence of the automatic pneumatic valves 102 in the floor of the tail or aft cup. In operation, when the gas pressure in the intercup zone falls to a level too far below that in the upstream zone, valves 102, because of the relative weakness of the helical springs keeping them seated, open inwardly into the intercup zone for intermittent, brief periods. If the propelling apparatus should be traveling too fast, the weights 82, then revolving with extra speed, corresponding to the accelerated rotation of wheel 26—28, which has imparted greater energy (for the rotation of the two torque shafts) through the two bevel gears 72 and 46a, then swing radially outwardly. Through the action of the weight-affixed links 84 and the yokes 92, the spring 94 is compressed, whereupon the valve mounting flange 97, together with the valves 98 in the fore cup, withdraw rearwardly, and, as stated above, the ports become cleared to a certain extent, thereby producing a lessening of the contrast between the pneumatic pressures respectively characterizing the intercup zone and the downstream zone, whereupon the apparatus decelerates. Should the deceleration proceed too far, the ports in the fore cup close and the described cycle reverses; in this way, a balance between excessive and insufficient speed is attained. The apparatus propelling force consists in the application of the pneumatic pressure in the intercup zone to the aft side of the floor of practically the fore cup alone.

Although cup 22, as described and illustrated, lends itself to the simple retrieving of the apparatus (without the executing of any pipeline servicing operations) by the reversing of the differential pneumatic pressures, persons skilled in the art will not experience difficulty conceiving, for the centering and the supporting of the cup 22 end of the apparatus, at least one means different from the one which has been described and is illustrated in the various views. Also to be expected are other embodiments incorporating departures from the particular details described and illustrated and which notwithstanding are encompassed by at least one of the following claims.

What is claimed is:

1. Apparatus for servicing inside a pipeline of the type adapted for translational movement under differential pneumatic pressures of gas fluids respectively occupying zones upstream and downstream of said apparatus which comprises two end members, at least one of which is of cup form and made of elastomeric material and having an outside diameter normally exceeding the pipeline inside diameter, the flange thereof extending upstream, the other end member adapted to prevent yawing of the apparatus during translational movement in said pipeline, force transmitting means including a wheel resiliently urged into rolling engagement with the pipeline inside surface, the fore member being provided with pneumatic valve means, and a governor mechanism coupled to said wheel and to said valve means for automatic control of said differential pressures in dependence upon the speed of said apparatus.

2. Apparatus as described in claim 1 in which said other end member is provided with at least one spring-loaded automatic check valve to admit gas from the upstream zone into the zone between said end members.

References Cited in the file of this patent

FOREIGN PATENTS 1,104,201    France _____ June 8, 1955